United States Patent
Yamazaki

(10) Patent No.: US 9,520,152 B2
(45) Date of Patent: Dec. 13, 2016

(54) OPTICAL INFORMATION RECORDING/REPRODUCING APPARATUS

(71) Applicant: Hitachi-LG Data Storage, Inc., Tokyo (JP)

(72) Inventor: Kazuyoshi Yamazaki, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 14/848,683

(22) Filed: Sep. 9, 2015

(65) Prior Publication Data

US 2016/0118076 A1    Apr. 28, 2016

(30) Foreign Application Priority Data

Sep. 10, 2014 (JP) ................................. 2014-183802

(51) Int. Cl.
   G11B 7/00    (2006.01)
   G11B 7/1365    (2012.01)
   G11B 7/08    (2006.01)
   G11B 7/085    (2006.01)

(52) U.S. Cl.
   CPC ............. G11B 7/1365 (2013.01); G11B 7/083 (2013.01); G11B 7/08564 (2013.01)

(58) Field of Classification Search
   CPC ......... G11B 7/0065; G11B 7/083; G11B 7/00; G11B 7/1374; G11B 7/1365; G11B 7/08564
   USPC .............................. 369/103, 112.23, 119, 118
   See application file for complete search history.

(56) References Cited

U.S. PATENT DOCUMENTS

| 6,256,281 | B1 * | 7/2001 | Tanaka | G11C 13/042 369/103 |
| 7,804,758 | B2 * | 9/2010 | Fukuda | G11B 7/0065 369/103 |
| 8,040,783 | B2 * | 10/2011 | Endo | G11B 7/082 369/103 |
| 2006/0007512 | A1 | 1/2006 | Kanesaka et al. | |
| 2010/0128591 | A1 | 5/2010 | Shimada | |
| 2014/0029404 | A1 | 1/2014 | Shimada | |

FOREIGN PATENT DOCUMENTS

JP    2006-017898 A    1/2006
JP    2006-23445 A    1/2006
(Continued)

*Primary Examiner* — Nabil Hindi
(74) *Attorney, Agent, or Firm* — Mattingly & Malur, PC

(57) ABSTRACT

A hologram apparatus and hologram optical system includes: a light source which emits a light beam; a splitter which splits the light beam emitted from the light source into a first light beam and a second light beam; a first lens for exposing an optical information recording medium to convergent light of the first light beam; an optical path angle varying device which causes the second light beam to become incident at substantially the same position as the first light beam in the optical information recording medium and changes an angle of incidence of the second light beam incident on the optical information recording medium; and an optical path shifting element which shifts a position of a light beam incident on the optical information recording medium, according to an angle to the optical information recording medium of the light beam incident on the optical information recording medium.

12 Claims, 12 Drawing Sheets

(56) References Cited

FOREIGN PATENT DOCUMENTS

| | | |
|---|---|---|
| JP | 2006-78942 A | 3/2006 |
| JP | 2010-129110 A | 6/2010 |
| JP | 2014-26706 A | 2/2014 |

* cited by examiner

FIG. 8A
FIG. 8B
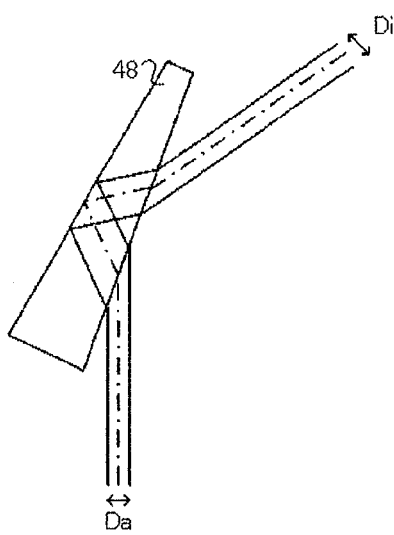
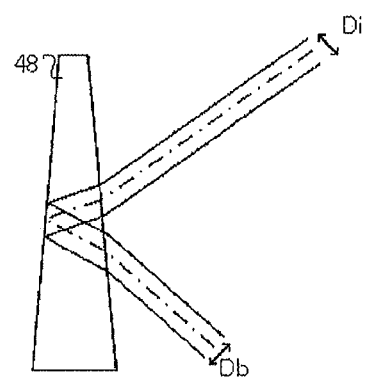

OPTICAL INFORMATION RECORDING/REPRODUCING APPARATUS

TECHNICAL FIELD

The present invention relates to a technique of recording information on or reproducing information from an optical information recording medium, using holography.

BACKGROUND ART

A background technique in the present technical field is, for example, JP-A-2006-23445 (PTL 1). This literature includes, as a problem, the description that "at the time of recording a hologram by an angle-multiplexing recording method, even if the angle of incidence of a reference beam is changed, the area exposed to this reference beam on a holographic recording material is to be made constant at any time". As a solution, the literature includes the description that "in changing the angle of a scan mirror 12 in order to change the angle of incidence of a reference beam 200 on a holographic recording material 15, the slit 11 is linked to this and changed in the angle thereof, thus causing the beam diameter of the reference beam 200 to be changed by the slit 11 in such a way that the range of exposure on the holographic recording material 15 is not changed by the change in the angle of incidence of the reference beam 200 but stays constant. Therefore, at the time of recording a hologram by an angle-multiplexing recording method, even if the angle of incidence of the reference beam 200 is changed, the area exposed to this reference beam 200 on the holographic recording material 15 can be made constant at any time." Also, JP-A-2006-78942 (PTL 2) includes, as a problem, the description that "at the time of recording a hologram by an angle-multiplexing recording method, even if the angle of incidence of a reference beam is changed, the area exposed to this reference beam on a holographic recording material is to be made constant at any time without causing mechanical wear and without impairing the high scanning speed and the small and lightweight configuration." As a solution, the literature includes the description that "if a diffraction grating 111 and a holographic recording material 14 are arranged in a relation for imaging with each other via a telecentric optical system made up of lenses 12, 13, even if the angle of incidence of a reference beam 200 is changed by the diffraction grating 111 and the angle of incidence on the holographic recording material 14 is thus changed, the exposure area exposed to the reference beam 200 on the holographic recording material 14 can be made constant since the diffraction grating 111 and the holographic recording material 14 are in a relation for imaging. Moreover, this effect can be realized without impairing the high scanning speed and the small and lightweight configuration and without causing mechanical wear."

CITATION LIST

Patent Literature

PTL 1: JP-A-2006-23445
PTL 2: JP-A-2006-78942

SUMMARY OF INVENTION

Technical Problem

A holographic memory is a system in which a signal beam and a reference beam are made to interfere with each other and record, thus recording the interference pattern on an optical information recording medium as a hologram. For example, in a two-beam angle multiplexing method, multiplexing recording of a hologram is carried out at the same position on an optical information recording medium, changing the angle of incidence of a reference beam. Then, at the time of reproduction, the reference beam is made incident on the optical information recording medium at the same angle of incidence as in the recording, and a reproduction beam diffracted from the hologram is detected by an image pickup element, thus reproducing the information recorded on the optical information recording medium.

Generally, in the holographic memory, recording density can be improved by increasing the number of multiplex recordings or reducing the size of a hologram on the optical information recording medium. Also, in the two-beam angle multiplexing method, recording density can be improved further by reducing the distance between holograms next to each other on the medium. However, in order to improve recording density in the two-beam angle multiplexing method, the following problem arises.

In the two-beam angle multiplexing method, since recording or reproduction is carried out changing the angle of incidence of the reference beam on the medium, the exposure area on the medium changes according to the angle of incidence. In contrast, the signal beam does not change. Therefore, if the angle of incidence of the reference beam becomes larger, unnecessary exposure increases and the recording material is exposed to light. Consequently, the problem arises that the number of multiplex recordings cannot be increased, the distance between holograms next to each other cannot be reduced, or the recording capacity falls because of both.

In order to solve this problem, in PTL 1 and PTL 2, unnecessary exposure is restrained by changing the size of the incident reference beam according to the angle of incidence on the optical information recording medium. If the size of the reference beam is thus optimized according to the angle of incidence of the reference beam, improvement in recording density is expected. However, in order to improve recording density further, the misalignment of the reference beam on the optical information recording medium due to the angle of incidence needs to be taken into account.

As the position on the optical information recording medium changes according to the angle of incidence, this must be taken into account in deciding the effective diameter of the reference beam. Thus, unnecessary exposure occurs and recording density falls. Therefore, in order to improve recording density, the misalignment of the reference beam needs to be corrected. PTL 1 and PTL 2 include no specific description about this.

Thus, an object of the invention is to provide a hologram apparatus and a hologram optical system for improving the recording capacity of a holographic memory.

Solution to Problem

The above object can be achieved by the following configuration as an example.

An optical information recording/reproducing apparatus for recording information on or reproducing information from an optical information recording medium, using holography, includes: a light source unit which emits a light beam; a splitting unit which splits the light beam emitted from the light source unit into a first light beam and a second light beam; a first lens unit for exposing an optical information recording medium to convergent light of the first light beam; an optical path angle varying unit which causes the second light beam to become incident at substantially the same position as the first light beam in the optical information recording medium and changes an angle of incidence of the second light beam incident on the optical information recording medium; and an optical path shifting unit which shifts a position of a light beam incident on the optical information recording medium, according to an angle to the optical information recording medium of the light beam incident on the optical information recording medium.

Advantageous Effect of Invention

According to the invention, a hologram apparatus and a hologram optical system for improving the recording capacity of a holographic memory can be provided.

BRIEF DESCRIPTION OF DRAWINGS

FIG. 8A shows a change in a size of a reference beam of a first size when only a wedge prism is rotated.
FIG. 8B shows a change in a size of a reference beam of a second, different size when only the wedge prism is rotated.

DESCRIPTION OF EMBODIMENTS

Example 1

Figure 1:
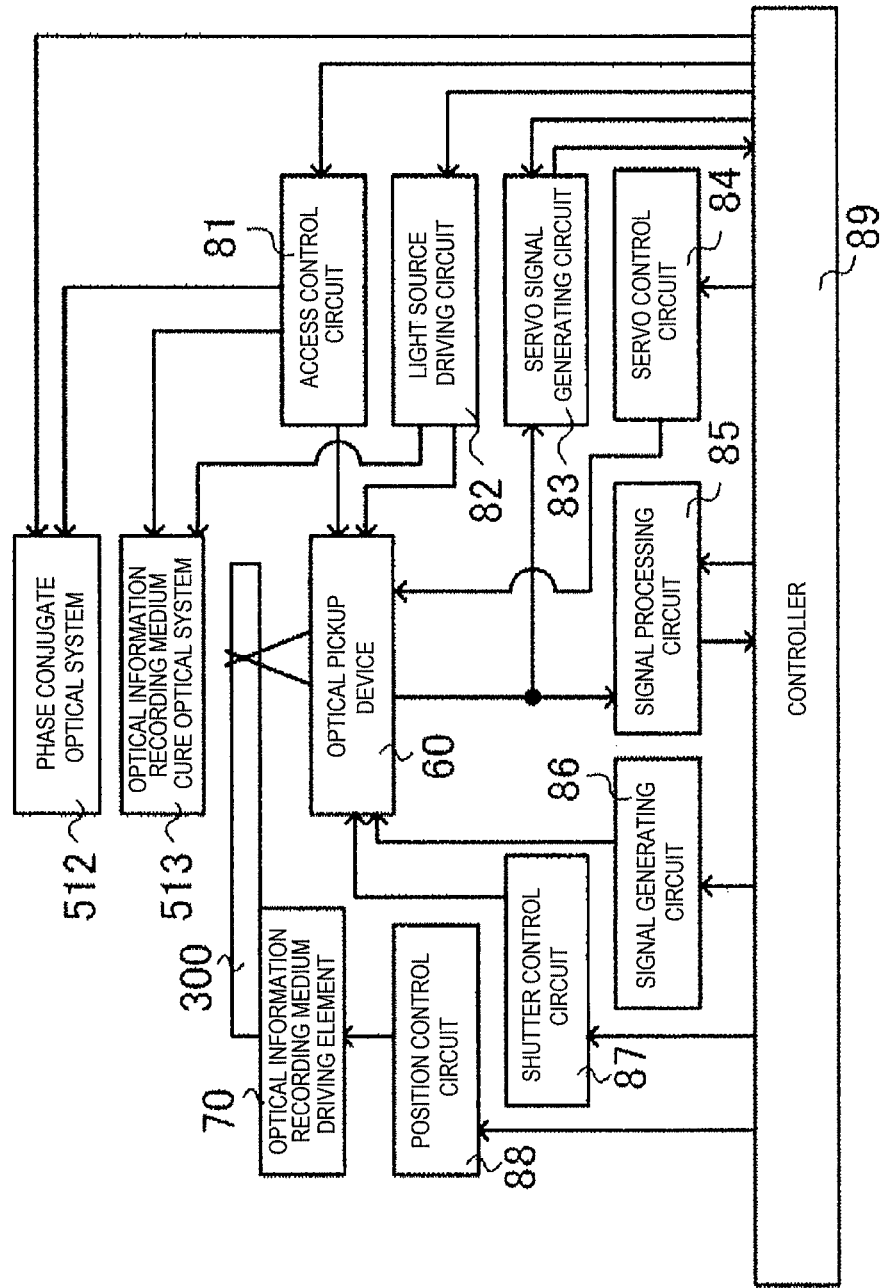
FIG. 1 is a view showing a holographic recording/reproducing apparatus in Example 1.
Figure 2:
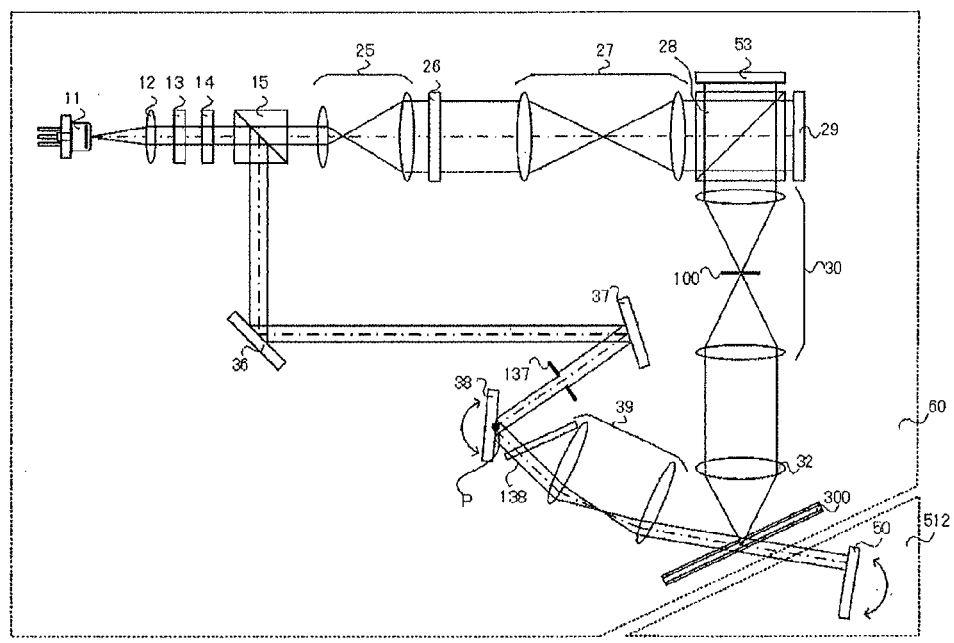
FIG. 2 is a view showing an optical system in Example 1.

FIG. 1 shows the overall configuration of a holographic recording/reproducing apparatus according a first example of the invention. The holographic recording/reproducing apparatus includes an optical pickup device 60 having, for example, a configuration as shown in FIG. 2, a phase conjugate optical system 512, an optical information recording medium Cure optical system 513, and an optical information recording medium driving element 70.

The optical pickup device 60 plays the role of emitting a reference beam and a signal beam to an optical information recording medium 300 and recording digital information, using a hologram. In this case, the information signal to be recorded is sent into a spatial light modulator in the optical pickup device 60 via a signal generating circuit 86 by a controller 89, and the signal beam is modulated by the spatial light modulator. In the case of reproducing information recorded on the optical information recording medium 300, a phase conjugate beam of the reference beam emitted from optical pickup device 60 is generated by the phase conjugate optical system 512. Here, the phase conjugate optical system 512 refers to, for example, a galvano mirror 50 in the case of FIG. 2. Also, the phase conjugate beam refers to a light wave traveling in the opposite direction of input light while maintaining the same wavefront as the input light.

The recovered beam recovered with the phase conjugate beam is detected by an image pickup element 53 in the optical pickup device 60 and a signal is reproduced by a signal processing circuit 85. The exposure time of the reference beam and the signal beam to which the optical information recording medium 300 is exposed can be adjusted by the controller 89 controlling the open/close time of a shutter 13 in the optical pickup device 60 via a shutter control circuit 87. The optical information recording medium Cure optical system 513 plays the role of generating a light beam used for pre-cure and post-cure of the optical information recording medium 300. Here, the pre-cure refers to a pre-process in which, in recording information at a desired position in the optical information recording medium 300, the desired position is exposed to a predetermined light beam in advance before being exposed to the reference beam and the signal beam. The post-cure refers to an after-process in which, after information is recorded at a desired position in the optical information recording medium 300, the desired position is exposed to a predetermined light beam to disable further recording there.

From a light source driving circuit 82, a predetermined light source drive current is supplied to the light sources in the optical pickup device 60 and the optical information recording medium Cure optical system 513. From each light source, a light beam can be emitted with a predetermined amount of light.

It should be noted that, of the optical pickup device 60, the phase conjugate optical system 512 and the optical information recording medium Cure optical system 513, some optical system components or all the optical system components may be integrated into one configuration for simplification.

FIG. 2 shows the optical systems of the optical pickup device 60 and the phase conjugate optical system 512 in the holographic recording/reproducing apparatus based on a two-beam angle multiplexing method in this example. The recording or reproducing method in this example will be described, using FIG. 2. First, the recording method in this example will be described.

A light beam emitted from a light source 11 is transmitted through a collimating lens 12 and converted to a desired beam diameter, and subsequently passes through a shutter 13 and becomes incident on a variable polarizing element 14. Then, the light beam is converted into polarized light including a P-polarized component and an S-polarized component by the variable polarizing element 14. The variable polarizing element 14 is an element which converts the light beam into predetermined polarized light according to the recording or reproduction. In this example, at the time of recording, the light beam is converted into polarized light including a P-polarized component and an S-polarized component, and at the time of reproduction, the light beam is converted into S-polarized light.

The light beam emitted from the variable polarizing element 14 becomes incident on a PBS prism 15, where the P-polarized component is transmitted and the S-polarized component is reflected. Here, the light beam transmitted through the PBS prism 15 is called a signal beam, and the reflected light beam is called a reference beam. The signal beam transmitted through the PBS prism 15 is converted into a desired beam diameter by a beam expander 25. The signal beam transmitted through the beam expander 25 travels through a phase mask 26, a relay lens 27 and a PBS prism 28 and becomes incident on a spatial light modulator 29. The spatial light modulator 29 is an optical element which adds two-dimensional data to the signal beam.

The signal beam with the information added by the spatial light modulator 29 is reflected by the PBS prism 28 and becomes incident on an aperture 100 via a relay lens 30. The aperture 100 is arranged for the purpose of eliminating a high-frequency component of the signal beam added by the spatial light modulator 29, in order to increase the recording density of the optical recording medium. The signal beam emitted from the aperture 100 is condensed in the optical information recording medium 300 via an objective lens 32.

Meanwhile, the reference beam reflected by the PBS prism 15 becomes incident on an aperture width control element 137 via a mirror 36 and a mirror 37. The aperture width control element 137 is an element which changes the width of the reference beam in a predetermined direction at a high speed. For example, the slit described in PTL 1 may be used, or two light shielding bands may be physically driven. In this example, a description is given with the user of two light shielding bands.

The reference beam exiting the aperture width control element 137 becomes incident on the optical information recording medium 300, via a galvano mirror 38, an optical path shifting element 138 and a scanner lens 39. Here, the galvano mirror 38 can change the angle of the mirror and can change the angle of incidence of the reference beam on the optical information recording medium. The optical path shifting element 138 is an optical element for reducing the misalignment of the reference beam in the optical information recording medium 300 due to the change in the angle of incidence of the reference beam on the optical information recording medium 300. In this example, a parallel flat plate of glass is used. Also, the scanner lens 39 is a lens that can cause the reference beam at a predetermined angle reflected by the galvano mirror 38, to become incident at a predetermined angle at substantially the same position in the optical information recording medium 300. Therefore, using the galvano mirror 38, the optical path shifting element 138 and the scanner lens 39, angle multiplexing at substantially the same position can be realized.

At this point, the signal beam, which is convergent light, and the reference beam, which is substantially parallel light, are made to be incident on the optical information recording medium 300 in such a way as to overlap with each other. Thus, an interference pattern is formed in the optical information recording medium 300 and this interference pattern is recorded as a hologram on the recording material in the optical information recording medium 300.

Then, after the information is recorded on the optical information recording medium 300, the shutter 13 is closed and the next information to be recorded is displayed by the spatial light modulator 29. At the same time, the galvano mirror 38 rotates by a very small amount, thus changing the angle of incidence of the reference beam on the optical information recording medium 300. Also, at this point, the aperture width control element 137 is driven, changing the size of the reference beam. Subsequently, as the shutter 13 is opened, the next information is recorded at substantially the same position in the optical information recording medium 300. As this is repeated, angle-multiplexing recording is carried out. Then, when a predetermined number of multiplex recordings is reached, the position of the optical information recording medium 300 is moved and further recording is carried out. Here, each piece of information recorded at substantially the same position by angle multiplexing is called a page, and the area recorded by angle multiplexing is called a book.

Next, the reproducing method will be described. A light beam emitted from the light source 11 is transmitted through the collimating lens 12 and converted into a desired beam diameter, and subsequently passes through the shutter 13 and becomes incident on the variable polarizing element 14. Then, the light beam is converted to S-polarized light by the variable polarizing element 14 and reflected by the PBS prism 15. The reference beam reflected by the PBS prism 15 becomes incident on the galvano mirror 50, via the mirror 36, the mirror 37, the aperture width control element 137, the galvano mirror 38, the optical path shifting element 138, the scanner lens 39 and the optical information recording medium 300. At this point, the aperture width control element 137 is set to achieve a maximum size of the reference beam. Thus, even if relative misalignment between the reference beam and the book or the like occurs, the influence thereof can be reduced because of the large size of the reference beam.

The galvano mirror 50 is controlled by the controller 89 in such a way that the reference beam becomes substantially perpendicular to the galvano mirror 50. The reference beam incident thereon is reflected in a substantially opposite direction and becomes incident on the optical information recording medium 300 again. Here, when the reference beam becomes incident on a predetermined book in the optical information recording medium 300, a recovered beam is generated as a diffracted beam from the hologram in the optical information recording medium 300. Diffracted beams are generated also from the neighboring books other than the predetermined book. Here, the diffracted beams from the neighboring books are called other diffracted beams.

The recovered beam and the other diffracted beams pass through the objective lens 32 and become incident on the aperture 100 in the relay lens 30. The aperture 100 is configured in such a way that only the recovered beam, of the recovered beam and the other diffracted beams, can be transmitted. The recovered beam transmitted through the aperture 100 becomes incident on the image pickup element 53 via one side of the relay lens 30 and the PBS prism 28. Based on the recovered beam incident on the image pickup element 53, reproduction image data is generated.

Next, the galvano mirror 38 rotates by a very small amount, changing the angle of incidence of the reference beam on the optical information recording medium 300. Thus, image data of different pages in the same book are reproduced. Then, when the reproduction of a predetermined number of pages is finished, the position of the optical information recording medium 300 is moved and the reproduction of the next book is carried out.

Here, the effects of the optical path shifting element 138 in this example will be described. First, the related-art problem will be described.

Figure 3A:
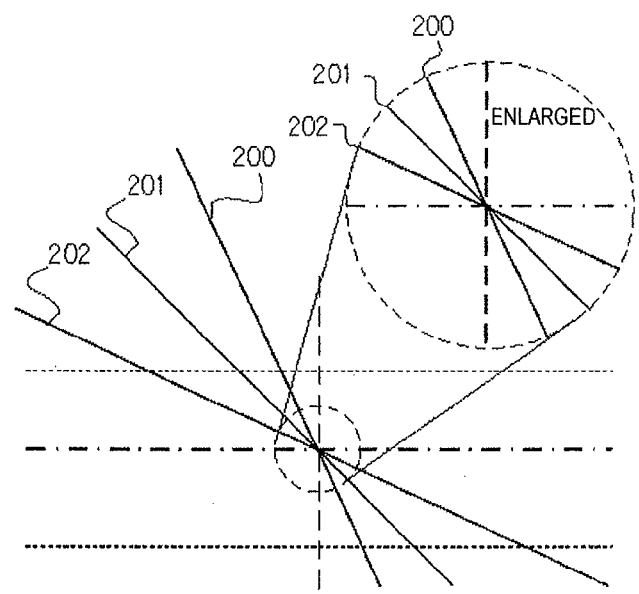
FIG. 3A shows the relation between the center of a reference beam and an optical recording medium.
Figure 3B:
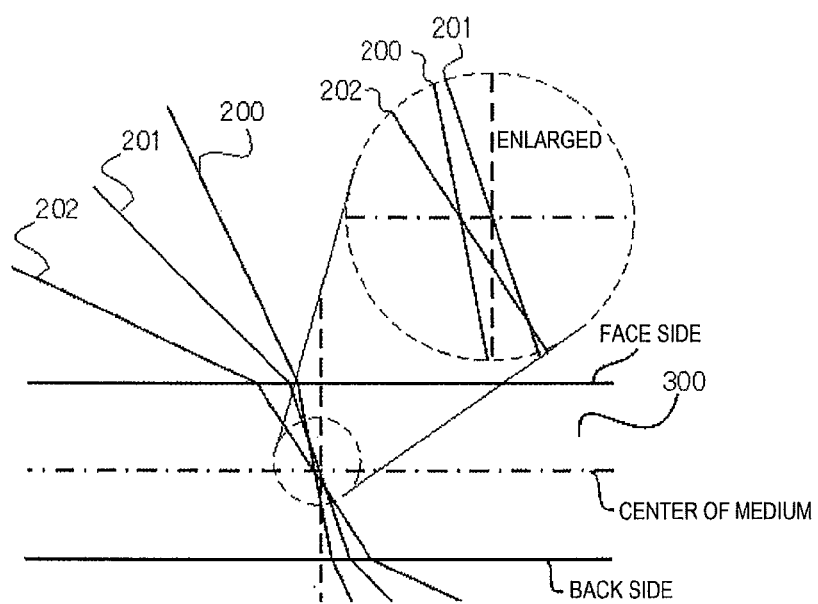
FIG. 3B shows the case where the optical information recording medium is taken into account.

FIG. 3 shows the relation between the center of the reference beam and the optical information recording medium 300. FIG. 3(A) shows the case where the optical information recording medium 300 is absent. FIG. 3(B) shows the case where the optical information recording medium 300 is taken into account. A light beam 200, a light beam 201 and a light beam 202 each indicate the center beam line of the reference beam and show the state of the reference beam when different pages are recorded or reproduced.

Here, it can be seen that in FIG. 3(A), the light beam 200, the light beam 201 and the light beam 202 intersect with each other at one point, whereas in FIG. 3(B), the light beam 200, the light beam 201 and the light beam 202 are misaligned from each other. This is because refraction by the optical information recording medium 300 takes place, indicating that the reference beam changes position according to the angle of incidence on the optical information recording medium 300. Hereinafter, the misalignment of the reference beam in the optical information recording medium 300 is called the misalignment of the reference beam.

Figure 4A:
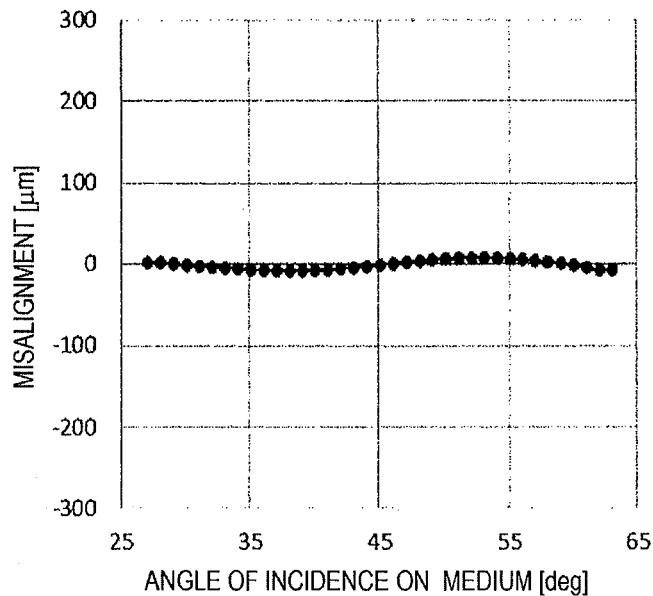
FIG. 4A shows the case where the optical information recording medium is absent.
Figure 4B:
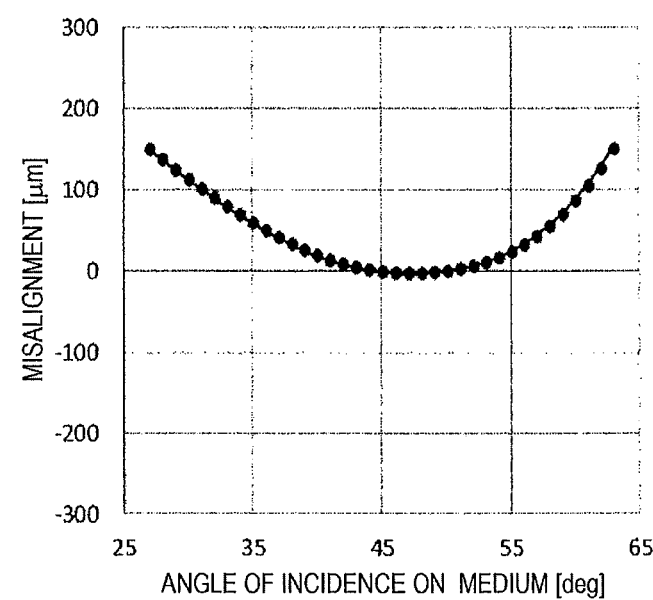
FIG. 4B shows the case where the optical information recording medium is taken into account.

FIG. 4 shows the results of a simulation of the dependence on the angle of incidence, of the center beam position of the reference beam in the optical information recording medium 300. FIG. 4(A) shows the case where the optical information recording medium 300 is absent. FIG. 4(B) shows the case where the optical information recording medium 300 is taken into account. The calculation conditions are given as follows.

[Calculation Conditions]
Angle of incidence of the reference beam: 45±18 deg
Optical information recording medium 300, configured with the recording material held between glasses
    Glass (incident side) thickness: 1 mm
    refraction index: 1.5
    Recording material thickness: 2 mm
    refraction index: 1.5
    Glass (exiting side) thickness: 1 mm
    refraction index: 1.5
Center of rotation of the mirror: the center beam position of the reference beam on the reflection surface
Calculate the amount of misalignment at the position of the center (2.0 mm) of the optical information recording medium 300.
Calculate the amount of change, based on the position of the angle of incidence of the reference beam of 45 deg as a reference.
Adjust the distance between the scanner lens 39 and the optical information recording medium 300 in such a way that the amount of misalignment of the reference beam under the above conditions is minimized.

As described with reference to FIG. 3, it can be understood that in the case where the optical information recording medium 300 is absent, the misalignment of the reference beam is little, whereas in the case where the optical information recording medium 300 is taken into account, the misalignment of the reference beam is generated. The misalignment in FIG. 4(A) does not occur in ideal situations and depends on the design of the scanner lens 39.

In this way, the related-art configuration has a problem that since the misalignment of the reference beam occurs on the optical information recording medium 300, the incident reference beam must be increased and recording density falls accordingly.

Figure 5:
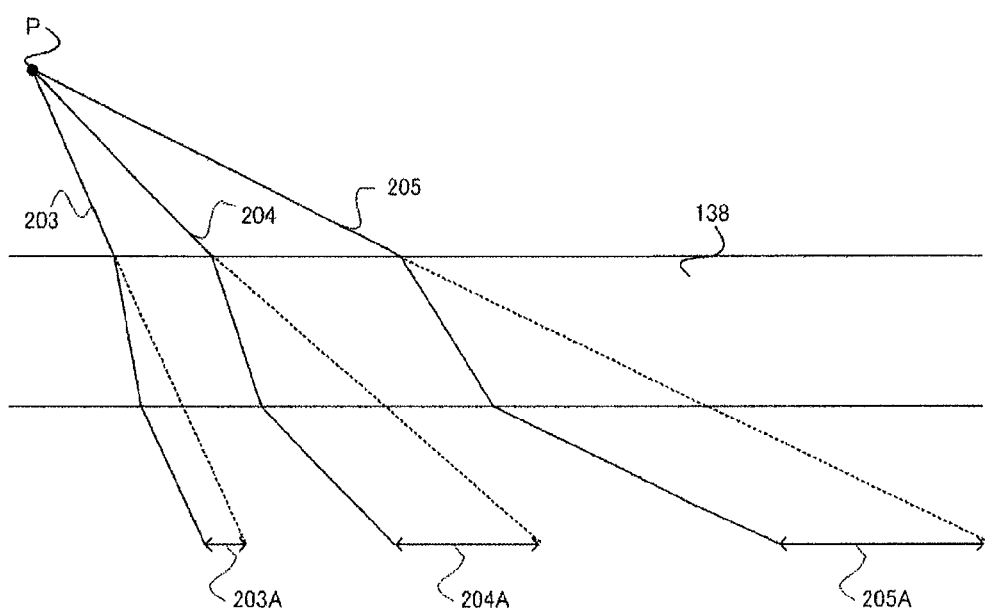
FIG. 5 is a view explaining an optical path shifting element in Example 1.

In this example, in order to solve the above problem, the optical path shifting element 138 is installed in the optical system. FIG. 5 shows the relation between the center of the reference beam and the optical path shifting element 138. Here, the solid lines correspond to the case where the optical path shifting element 138 is present, and the dashed lines correspond to the case where the optical path shifting element 138 is absent. A light beam 203, a light beam 204 and a light beam 205 each indicate the center of the reference beam, and the state where these light beams have different exiting angles from the galvano mirror 38 is shown. In practice, the position P of the reference beam varies depending on the center of rotation of the galvano mirror 38. However, here, the axis including the face side of the galvano mirror 38 and including the position where the reference beam becomes incident, as shown in FIG. 2, is regarded as the center of rotation in order simplify the explanation.

As the optical path shifting element 138 in this example, a parallel plate of glass is used. The reference beam reflected by the galvano mirror 38 becomes incident on the parallel plate. At this point, refraction occurs according to the angle of incidence of the reference beam on the parallel plate. Since the change in angle due to refraction depends on the angle of incidence on the parallel plate, the misalignment of the reference beam occurs in the parallel plate according to the angle of incidence. Then, when exiting the parallel plate, the reference beam becomes refracted again and achieves the same reference beam angle as before becoming incident on the parallel plate. Therefore, the position of the light beam becomes misaligned according to the angle of incidence on the parallel plate, as indicated by a length 203A, a length 204A and a length 205A. In this example, the misalignment in the optical information recording medium 300 is corrected, using the misalignment of the reference beam generated in this optical path shifting element 138.

Figure 6:
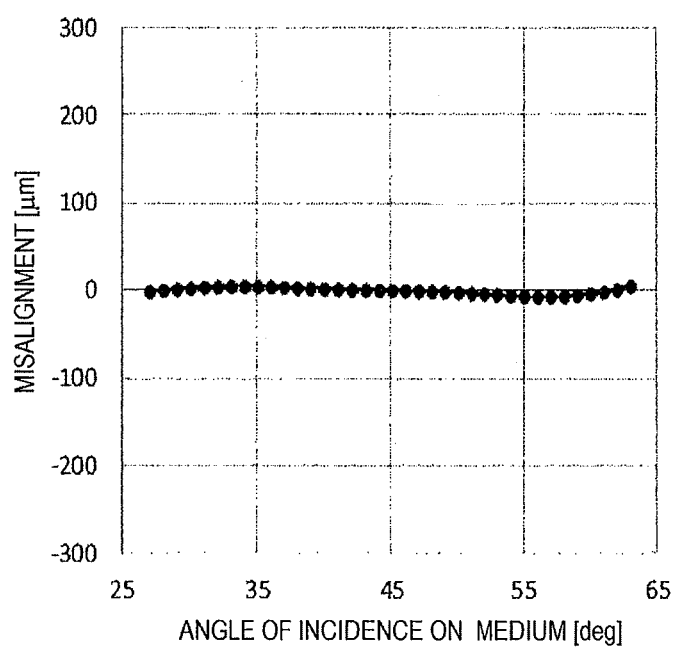
FIG. 6 is a view explaining the effects of the optical path shifting element in Example 1.

FIG. 6 shows the results of a simulation of the dependence on the angle of incidence, of the center beam position of the reference beam in the optical information recording medium 300. The calculation conditions are similar to the conditions in FIG. 4, except that a parallel plate with a thickness of 2.9 mm and a refraction index of 1.5 is installed in the same posture so as to be substantially parallel to the optical information recording medium 300.

In FIG. 6, compared with FIG. 4(B), it can be understood that the misalignment of the reference beam in the optical information recording medium 300 is successfully restrained. Thus, in this example, the misalignment of the reference beam in the optical information recording medium 300 is retrained by installing the parallel plate in the optical system. In the hologram device in this example, since the scanner lens is arranged, good performance can be achieved by tilting the parallel plate and the optical recording medium 300 in the same direction.

As described above, in this example, since the optical path shifting element 138 is arranged to restrain the misalignment due to the angle of incidence of the reference beam, there is no need to increase the reference beam more than necessary. Therefore, unnecessary exposure can be prevented and consequently high-density recording in the hologram system is possible.

In this example, the optical path shifting element 138 and the optical information recording medium 300 (glass, recording material) have the same refractive index. However, in practice, there are cases where the refractive index may differ. In such cases, optimization can be done as follows.
    Change the thickness of the parallel plate
    Tile the parallel plate Use a wedge prism as the optical path shifting element 138

Tilt the wedge prism of the optical path shifting element 138

Change the center of rotation of the galvano mirror 38

If a wedge prism is used as the optical path shifting element 138, the tilt of the reference beam exiting the optical path shifting element 138 differs. In this case, the reference beam may be made incident on the optical path shifting element 138, at an angle in consideration of the above in advance. Also, while the optical path shifting element 138 is made of glass in this example, the material is not limited.

Also, for example, the misalignment of the reference beam caused by variations in design and components of the scanner lens 39 may be corrected by the optical path shifting element 138. Moreover, the misalignment of the reference beam in the optical information recording medium 300 can be corrected by horizontally or vertically shifting a part of the lenses in the scanner lens 39 in an optimum state, in relation to the lens group, or by tilting the part in relation to the horizontal axis, in the state where there is no medium as in this example. Therefore, the misalignment may be corrected, using a part of the lenses in the scanner lens 39 or using a combination with optical path shifting element 138 in this example. At this point, if a part of the lenses in the scanner lens 39 is shifted, the wavefront aberration of the reference beam deteriorates and therefore reproducing performance deteriorates. In contrast, in the case of the parallel plate or wedge prism of the optical path shifting element 138 in this example, since the reference beam is a parallel beam, there is an advantage that there is no deterioration in the wavefront aberration.

While the optical path shifting element 138 is not driven in this example, the optical path shifting element 138 may be configured to be driven. In this case, the tilt of the optical path shifting element 138 can be changed. Thus, it becomes possible to correct the shift of the light beam due to temperature change, change with time, wavelength change and the like. The direction of tilt is not limited to the recording direction described in this example, and correction may be made in a direction perpendicular thereto. Also, the amount of misalignment of the reference beam can be minimized by driving the optical path shifting element 138 synchronously with the galvano mirror 38. In this case, it is also possible to reduce the thickness of the optical path shifting element.

If a wedge prism is used as the optical path shifting element 138, the amount of correction can be changed by moving the position as well as by changing the tilt.

Moreover, while the optical path shifting element 138 is arranged between the galvano mirror 38 and the scanner lens 39 in this example, the optical path shifting element 138 may be arranged between the scanner lens 39 and the optical information recording medium 300. In this case, the optical path shifting element 138 may be arranged in such a posture that the optical path shifting element 138 and the optical information recording medium 300 are in a substantially axial symmetry about the substantially central axis of the scanner lens 39. The optical path shifting element 138 and the optical information recording medium 300 form an inverted V-like shape. The optical path shifting element 138 may also be arranged inside the scanner lens 39.

In this example, the aperture width control element 137 is installed. However, in view of stabilizing the position of the reference beam, similar effects can be achieved even if the aperture width control element 137 is not installed. Also, while the aperture width control element 137 is employed in the description in this example, a light beam width changing element, for example, a beam expander or the like, can achieve similar effects to this example. In this case, a cylindrical lens beam expander is desirable so that the light beam width in a predetermined direction changes. Moreover, similar effects to this example can also be achieved in the case where a diffraction element is used as in PTL 2.

While the galvano mirror 38 is employed in the description of the optical path angle varying unit in this example, the driving method is not limited. Also, while the galvano mirror 50 is employed in the description of the phase conjugate optical system 512, this is not limiting.

Example 2

Figure 7:
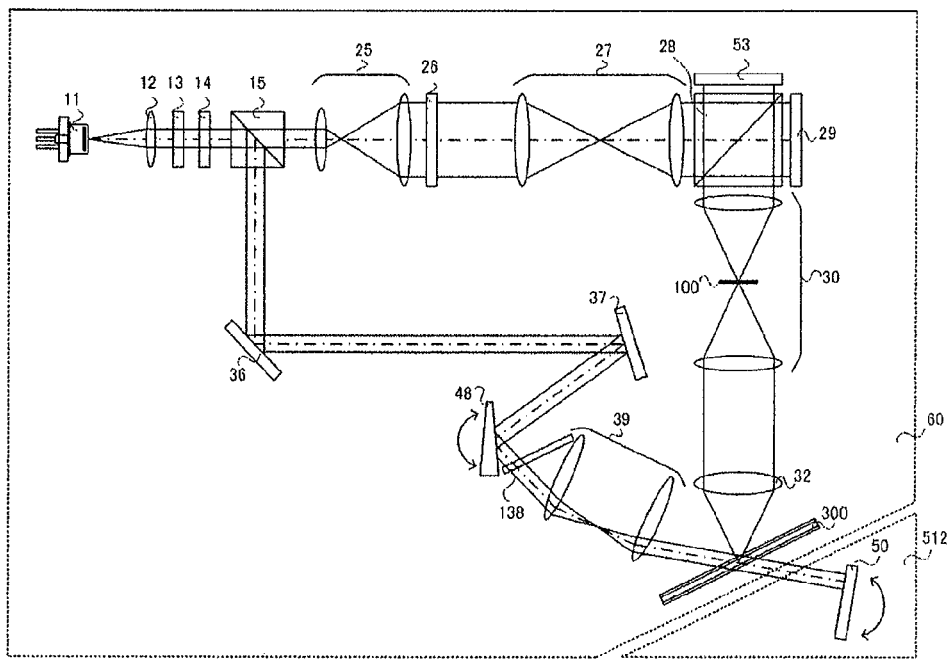
FIG. 7 is a view showing an optical system in Example 2.

FIG. 7 shows the optical system of an optical pickup device 60 in a holographic recording/reproducing apparatus based on a two-beam angle multiplexing method according to a second example of the invention. In Example 1, the angle of the reference beam is changed by the galvano mirror 38, whereas this example is characterized in that a wedge prism 48 is used. The other configurations are similar to Example 1. Therefore, in this example, the differences from Example 1 will be described. First, the recording method in this example will be described.

A light beam emitted from a light source 11 is split into a signal beam and a reference beam by a PBS prism 15, as in Example 1. The signal beam transmitted through the PBS prism 15 is condensed in an optical information recording medium 300, as in Example 1.

Meanwhile, the reference beam reflected by the PBS prism 15 becomes incident on the optical information recording medium 300, via a mirror 36, a mirror 37, a wedge prism 48, an optical path shifting element 138 and a scanner lens 39.

The wedge prism 48 can change the angle of rotation of the wedge prism and can change the angle of incidence of the reference beam on the optical information recording medium 300. The optical path shifting element 138 is an optical element which minimizes the misalignment of the recording position in the optical information recording medium 300. Here, a parallel plate of glass is used.

Here, the signal beam and the reference beam become incident in such a way as to overlap with each other in the optical information recording medium 300. Thus, an interference pattern is formed in the optical information recording medium 300, and this interference pattern is recorded as a hologram on a recording material in the optical information recording medium 300.

Then, after the information is recorded on the optical information recording medium 300, a shutter 13 is closed and the next information to be recorded is displayed by a spatial light modulator 29. At the same time, the wedge prism 48 rotates by a very small amount, thus changing the angle of incidence of the reference beam on the optical information recording medium 300. Subsequently, as the shutter 13 is opened, the next information is recorded at substantially the same position in the optical information recording medium 300. As this is repeated, angle-multiplexing recording is carried out. Then, when a predetermined number of multiplex recordings is reached, the position of the optical information recording medium 300 is moved and further recording is carried out.

Next, the reproducing method will be described. A light beam emitted from the light source 11 becomes incident on the optical information recording medium 300, via the collimating lens 12, the shutter 13, the variable polarizing element 14, the PBS prism 15, the mirror 36, the mirror 37, the wedge prism 48, the optical path shifting element 138, the scanner lens 39, the optical information recording medium 300, and the galvano mirror 50, as in Example 1. At this point, a recovered beam is generated as a diffracted beam from the hologram in the optical information recording medium 300. Then, this recovered beam is detected as in Example 1, thus performing reproduction.

This example is characterized in that the size of the reference beam is changed by rotating the wedge prism 48, instead of the mirror in Example 1.

FIG. 8 shows the relation between the wedge prism 48 and the exiting light beam. FIGS. 8(A) and 8(B) show change in the size of the reference beam in the case where only the wedge prism 48 is rotated. As the reference beam becomes incident on the wedge prism 48, the reference beam is internally reflected in the prism, diffracted from the prism surface and propagated in a predetermined direction. At this point, the size of the reference beam can be changed according to the angle of refraction on the prism surface.

In FIGS. 8(A) and 8(B), the exiting reference beam has different sizes (size Da, size Db) despite the same size Di of the incident reference beam. In this example, using this, the size of the reference beam in the optical information recording medium 300 is changed.

The relation between the size of the reference beam and the exiting angle can be optimized by designing the direction of the vertex of the wedge prism, the angle of the vertex of the wedge prism, the refractive index of the wedge prism, and the angle of incidence of the reference beam on the wedge prism. The wedge prism 48 in this example can change the size of the reference beam according to the angle of incidence on the optical information recording medium 300 and therefore is advantageous in that high light utilization efficiency can be realized in both recording and reproduction.

Figure 9A:
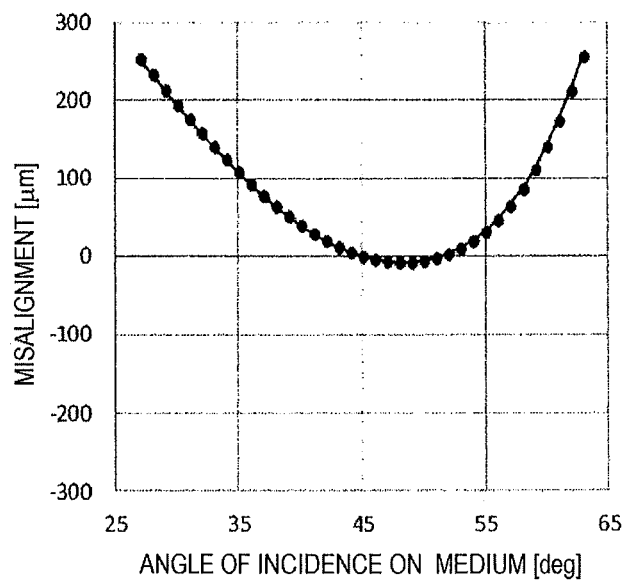
FIG. 9A shows the case where an optical path shifting element is absent.
Figure 9B:
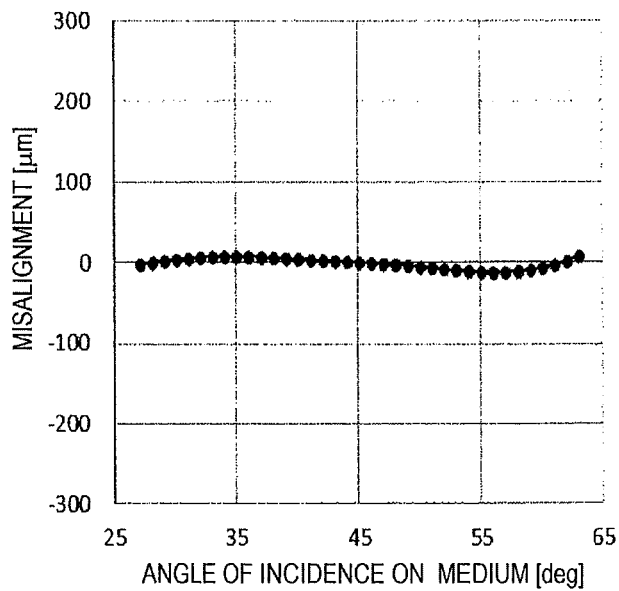
FIG. 9B shows the case where the optical path shifting element is present.

FIG. 9 shows the results of a simulation of the dependence on the angle of incidence, of the center beam position of the reference beam in the optical information recording medium 300. FIG. 9(A) shows the case where the optical path shifting element 138 is absent. FIG. 9(B) shows the case where the optical path shifting element 138 is present. The calculation conditions are given as follows.

[Calculation Conditions]
Angle of incidence of the reference beam: 45±18 deg
Optical information recording medium 300, configured with the recording material held between glasses
  Glass (incident side) thickness: 1 mm
  refraction index: 1.5
  Recording material thickness: 2 mm
  refraction index: 1.5
  Glass (exiting side) thickness: 1 mm
  refraction index: 1.5
  Optical path shifting element 138 thickness: 3.8 mm
  refractive index: 1.5
Center of rotation of the wedge prism: the centroid of the prism
Calculate the amount of misalignment at the position of the center (2.0 mm) of the optical information recording medium 300.
Calculate the amount of change, based on the position of the angle of incidence of the reference beam of 45 deg as a reference.
Adjust the distance between the scanner lens 39 and the optical information recording medium 300 in such a way that the amount of misalignment of the reference beam under the above conditions is minimized.

As FIG. 9(A) and FIG. 9(B) are compared, it can be understood that the misalignment of the reference beam can be restrained by using optical path shifting element 138. This is for similar reasons to Example 1.

As described above, in this example, since the optical path shifting element 138 is arranged to restrain the misalignment due to the angle of incidence of the reference beam, there is no need to increase the reference beam more than necessary. Therefore, unnecessary exposure can be prevented and consequently high-density recording in the hologram system is possible.

Example 3

Figure 10:
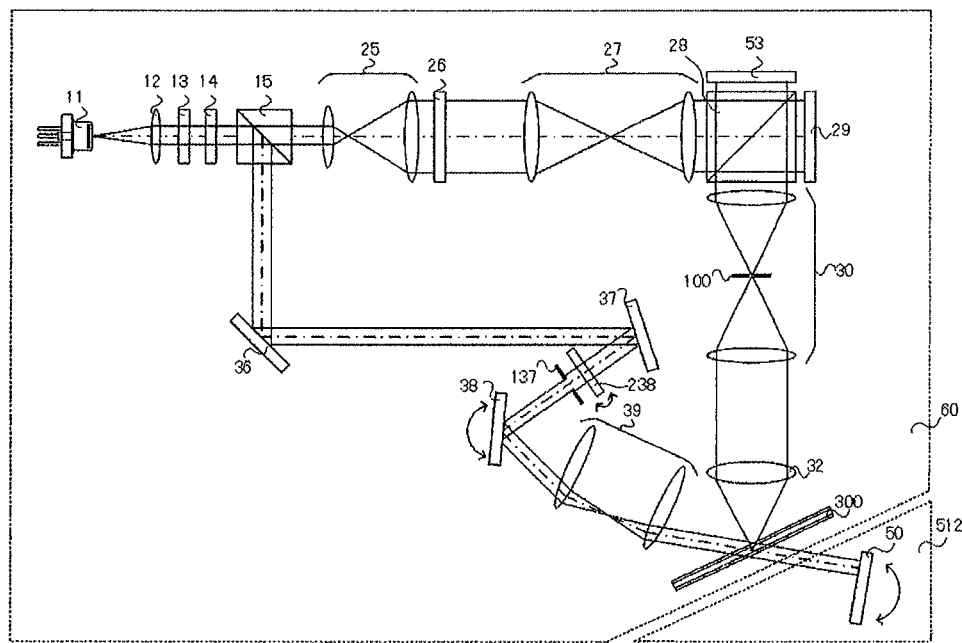
FIG. 10 is a view showing an optical system in Example 3.

FIG. 10 shows the optical system of an optical pickup device 60 in a holographic recording/reproducing apparatus based on a two-beam angle multiplexing method according to a third example of the invention. In Example 1, the misalignment of the reference beam on the optical information recording medium is corrected by the optical path shifting element 138, whereas this example is characterized in that an optical path shifting element 238 arranged before the galvano mirror 38 is driven. The other configurations are similar to Example 1. Therefore, in this example, the differences from Example 1 will be described.

The optical path shifting element 238 is configured to rotate a parallel plate by a galvanometer. The reference beam incident on the parallel plate is refracted and propagated at a different angle only in the parallel plate. Then, the reference beam exiting the parallel plate is refracted again and propagated in the same direction as before the incidence. At this point, the position of the reference beam shifts by the amount of shift in the parallel plate. Then, the amount of shift changes according to the angle of the parallel plate. In this example, using this, the parallel plate is dynamically controlled according to the angle of incidence of the reference beam in the optical information recording medium 300, and the misalignment of the reference beam in the optical information recording medium 300 is corrected. The correction sensitivity of the parallel plate can be changed with the thickness of the parallel plate, the refractive index of the parallel plate, and the angle of incidence of the reference beam.

As described above, in this example, since the optical path shifting element 238 is arranged to restrain the misalignment due to the angle of incidence of the reference beam, there is no need to increase the reference beam more than necessary. Therefore, unnecessary exposure can be prevented and consequently high-density recording in the hologram system is possible.

While the aperture width control element 137 and the optical path shifting element 238 are arranged separately in this example, these elements may be provided as a single element. In this case, a light shielding portion may be formed on the surface of a parallel plate and the parallel plate may be rotated, thus changing the size of the reference beam and correcting the misalignment thereof at the same time. Thus, a driving element is reduced and stable recording/reproduction can be realized. Also, the change in the size of the reference beam and the correction of the misalignment need not be carried out continuously, and the correction can be carried out intermittently after a predetermined number of pages are recorded. In this case, it is desirable that the optical path shifting element 238 is driven between recording/reproduction pages, in view of recording/reproducing speed.

This example is characterized in that the position of the reference beam incident on the galvano mirror 38 is shifted in order to correct the misalignment of the reference beam in the optical information recording medium 300. While the parallel plate is employed in the description of the optical path shifting element 238 in this example, for example, a wedge prism may be moved by a stepper motor or the like so as to shift the optical path, considering that similar effects can be achieved by shifting the optical path.

Also, the position of incidence on the galvano mirror 38 may be changed by rotating the wedge prism. Since the position of the reference beam in the optical information recording medium 300 can thus be changed, the misalignment corresponding to the angle of incidence can be corrected. At this point, though the angle of the reference beam is shifted as the wedge prism is rotated, the shift of the angle of the reference beam may be corrected, for example, by the galvano mirror 38. Also, the mirror 37 may be rotated similarly and the shift of the angle may be corrected by the galvano mirror 38. While the galvanometer is employed in the description of the rotating mechanism in this example, other driving mechanisms may also be employed.

As a method for controlling the optical path shifting element 238, a light receiving unit for control may be arranged to perform control. However, for example, an amount of shift with which the best amount of diffracted beam and reproducing performance can be achieved may be measured in advance with different angles at two or more different points, and the optical path shifting element 238 may be controlled on the basis of the result of optimal approximation of the amount of shift. In this case, since the sensitivity to the misalignment becomes higher as the reference beam becomes smaller, the amount of shift can be detected highly accurately.

The misalignment of the light beam due to temperature change, change with time, wavelength change and the like may be corrected using the optical path shifting element 238. Also, the optical path shifting element 238 may be arranged anywhere between the splitting point by the prism 15 and the optical information recording medium 300.

Example 4

Figure 11:
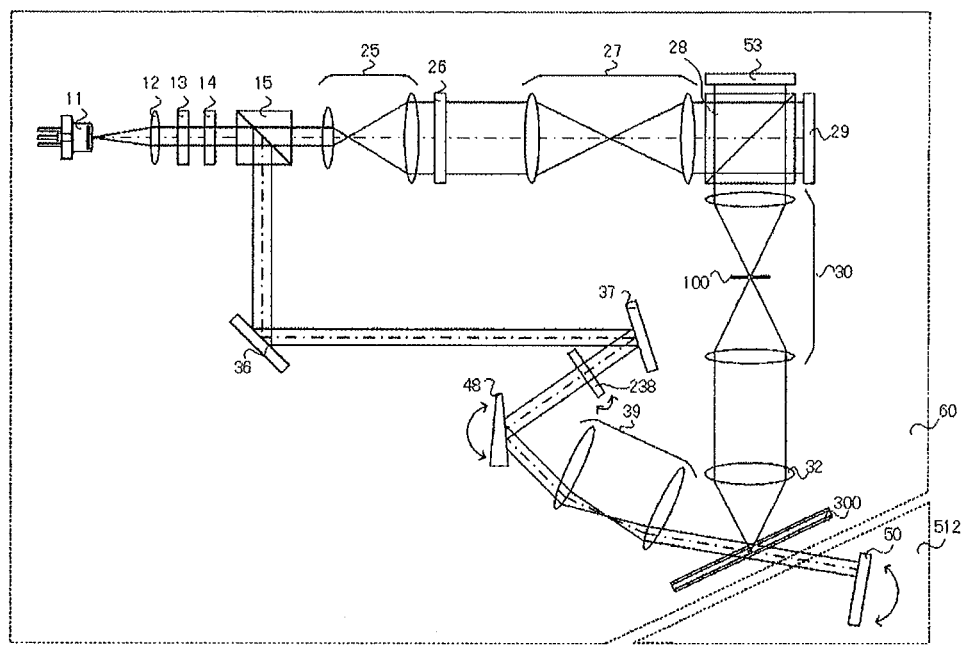
FIG. 11 is a view showing an optical system in Example 4.

FIG. 11 shows the optical system of an optical pickup device 60 in a holographic recording/reproducing apparatus based on a two-beam angle multiplexing method according to a fourth example of the invention. In Example 2, the misalignment of the reference beam on the optical information recording medium is corrected by the optical path shifting element 138, whereas this example is characterized in that a dynamic optical path shifting element 238 is installed arranged before a wedge prism 48. The other configurations are similar to Example 2. Therefore, in this example, the differences from Example 2 will be described.

The optical path shifting element 238 is configured to rotate a parallel plate by a galvanometer. The reference beam incident on the parallel plate is refracted and propagated at a different angle only in the parallel plate. Then, the reference beam exiting the parallel plate is refracted again and propagated in the same direction as before the incidence. At this point, the position of the reference beam shifts by the amount of shift in the parallel plate. Then, the amount of shift changes according to the angle of the parallel plate. In this example, using this, the parallel plate is dynamically controlled by a galvanometer according to the angle of incidence of the reference beam in the optical information recording medium 300, and the misalignment of the reference beam in the optical information recording medium 300 is corrected. The correction sensitivity of the parallel plate can be changed with the thickness of the parallel plate, the refractive index of the parallel plate, and the angle of incidence of the reference beam.

As described above, in this example, since the optical path shifting element 238 is arranged to restrain the misalignment due to the angle of incidence of the reference beam, there is no need to increase the reference beam more than necessary. Therefore, unnecessary exposure can be prevented and consequently high-density recording in the hologram system is possible.

Example 5

Figure 12:
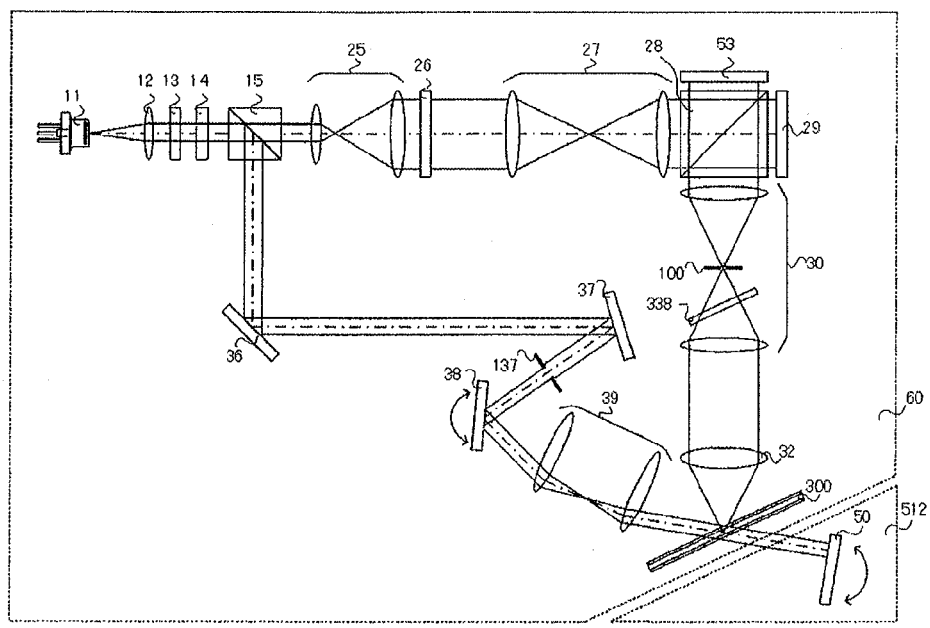
FIG. 12 is a view showing an optical system in Example 5.

FIG. 12 shows the optical system of an optical pickup device 60 in a holographic recording/reproducing apparatus based on a two-beam angle multiplexing method according to a fifth example of the invention. In Example 1, the optical path shifting element 138 is installed in the optical path of the reference beam, whereas this example is characterized in that an optical path shifting element 338 is installed in the optical path of the signal beam. First, the recording method in this example will be described.

A light beam emitted from a light source 11 is split into a signal beam and a reference beam by a PBS prism 15, as in Example 1. The signal beam transmitted through the PBS prism 15 becomes incident on the optical path shifting element 338, via a beam expander 25, a phase mask 26, a relay lens 27, a PBS prism 28, a spatial light modulator 29, a relay lens 30 and an aperture 100. The optical path shifting element 338 in tilted with respect to the aperture 100 and is arranged for the purpose of reducing the signal beam in an optical information recording medium 300. The signal beam exiting the optical path shifting element 338 is condensed in the optical information recording medium 300 via an objective lens 32.

Meanwhile, the reference beam reflected by the PBS prism 15 becomes incident on the optical information recording medium 300, via a mirror 36, a mirror 37, an aperture width control element 137, a galvano mirror 38 and a scanner lens 39.

At this point, the signal beam, which is convergent light, and the reference beam, which is substantially parallel light, are made to be incident on the optical information recording medium 300 in such a way as to overlap with each other. Thus, an interference pattern is formed in the optical information recording medium 300 and this interference pattern is recorded as a hologram on the recording material in the optical information recording medium 300.

Then, after the information is recorded on the optical information recording medium 300, a shutter 13 is closed and the next information to be recorded is displayed by the spatial light modulator 29. At the same time, the galvano mirror 38 rotates by a very small amount, thus changing the angle of incidence of the reference beam on the optical information recording medium 300. Also, at this point, the aperture width control element 137 is driven, changing the size of the reference beam. Subsequently, as the shutter 13 is opened, the next information is recorded at substantially the same position in the optical information recording medium 300. As this is repeated, angle-multiplexing recording is carried out. Then, when a predetermined number of multiplex recordings is reached, the position of the optical information recording medium 300 is moved and further recording is carried out.

Next, the reproducing method will be described. Alight beam emitted from the light source 11 becomes incident on the optical information recording medium 300, via the collimating lens 12, the shutter 13, the variable polarizing element 14, the PBS prism 15, the mirror 36, the mirror 37, the aperture width control element 137, the galvano mirror 38, the scanner lens 39, the optical information recording medium 300, and the galvano mirror 50, as in Example 1. Here, when the reference beam becomes incident on the optical information recording medium 300, a recovered beam is generated as a diffracted beam from a page included in a predetermined book. The recovered beam passes through the objective lens 32 and becomes incident on an image pickup element 52 via the relay lens 30, the optical path shifting element 338, the aperture 100 and the PBS prism 28. Based on the recovered beam incident on the image pickup element 53, reproduction image data is generated.

Next, the galvano mirror 38 rotates by a very small amount, changing the angle of incidence of the reference beam on the optical information recording medium 300. Thus, image data of different pages in the same book are reproduced. Then, when the reproduction of a predetermined number of pages is finished, the position of the optical information recording medium 300 is moved and the reproduction of the next book is carried out.

This example is characterized in that the optical path shifting element 338 is installed in the optical path of the signal beam. Since the signal beam becomes incident with a tilt on the optical information recording medium 300, the parts of the signal beam incident on the optical information recording medium 300 from both ends of the objective lens 32 are largely different in the angle of diffraction. Since this increases the signal beam on the optical information recording medium 300, the reference beam must be increased in order to perform stable recording or reproduction. Therefore, in order to realize high-density recording, it is desirable to reduce the signal beam on the optical information recording medium 300. Thus, in this example, the optical path shifting element 338 is installed in the optical path of the signal beam for the purpose of reducing the signal beam on the optical information recording medium 300. Also, in this example, a parallel plate of glass is used as the optical path shifting element.

The signal beam exiting the objective lens 32 in this example becomes incident with a tilt on the optical information recording medium 300, a large comatic aberration occurs on the optical information recording medium 300. Therefore, the signal beam becomes large on the optical information recording medium 300. Thus, in this example, the comatic aberration on the optical information recording medium 300 is corrected, by arranging the parallel plate in the relay lens 30 and thus applying an opposite aberration to the comatic aberration occurring on the optical information recording medium 300.

As described above, in this example, since the optical path shifting element 338 is arranged so as to reduce the signal beam on the optical information recording medium 300, there is no need to increase the reference beam more than necessary. Therefore, unnecessary exposure can be prevented and consequently high-density recording in the hologram system is possible.

This example is characterized in that the optical path shifting element 338 is arranged at the position where the signal beam converges or diverges, in order to correct the signal beam incident on the tilted optical information recording medium 300. Therefore, in this example, the optical path shifting element 338 is arranged on the objective lens 32 side of the relay lens 30. However, for example, the optical path shifting element 338 may be arranged on the PSB prism side of the relay lens 30, or the optical path shifting element 338 may be arranged in the relay lens 27.

The direction in which the optical path shifting element 338 is tilted may be changed according to convergence or divergence. Also, while the optical path shifting element 338 in this example is a parallel plate, this is not limiting and a wedge prism can achieve similar effects. Moreover, while the galvano mirror 38 is employed in the description in this example, the tilt of the reference beam may be changed by other methods. For example, the wedge prism 48 in Example 2 and the configuration of PTL 2 can achieve similar effects.

It should be noted that the invention is not limited to the above examples and includes various modifications. For example, the above examples are described in detail in order to explain the invention in a way that is easy to understand, and the invention is not necessarily limited to having all the configurations described. Also, a part of the configuration in an example can be replaced with the configuration of another example, and the configuration of one example can be added to the configuration of another example. Moreover, with respect to a part of the configuration of each example, addition, deletion or replacement with another configuration can be made. While each example is described using a holographic recording/reproducing apparatus, a holographic recording apparatus or a holographic reproducing apparatus may also be employed.

REFERENCE SIGNS LIST

11: light source, 12: collimating lens, 13: shutter, 14: variable polarizing element, 15: PBS prism, 25: beam expander, 26: phase mask, 27: relay lens, 28: PBS prism, 29: spatial light modulator, 30: relay lens, 32: objective lens, 36: mirror, 37: mirror, 38: galvano mirror, 39: scanner lens, 48: wedge prism, 50: galvano mirror, 53: image pickup element, 60: optical pickup device, 70: optical information recording medium driving element, 82: light source driving circuit, 83: servo signal generating circuit, 84: servo control circuit, 85: signal processing circuit, 86: signal generating circuit, 87: shutter control circuit, 88: position control circuit, 89: controller, 99: waveplate, 100: aperture, 137: aperture width control element, 138: optical path shifting element, 238: optical path shifting element, 300: optical information recording medium, 338: optical path shifting element, 512: phase conjugate optical system, 513: optical information recording medium Cure optical system

The invention claimed is:

1. An optical information recording/reproducing apparatus for recording information on or reproducing information from an optical information recording medium using holography, comprising:
    a light source which emits a light beam;
    a splitter which splits the light beam emitted from the light source into a first light beam and a second light beam;
    a first lens for exposing an optical information recording medium to convergent light of the first light beam;
    an optical path angle varying device which includes a scanner lens which causes the second light beam to become incident at substantially the same position as the first light beam in the optical information recording medium and an optical path angle varying element which changes an angle of incidence of the second light beam incident on the optical information recording medium; and
    an optical path shifting element which shifts a position of a light beam incident on the optical information recording medium, according to an angle to the optical information recording medium of the light beam incident on the optical information recording medium.

2. The optical information recording/reproducing apparatus according to claim 1, wherein
the optical path shifting element shifts the position of the second light beam incident on the optical information recording medium according to the angle to the optical information recording medium of rays which form the second light beam.

3. The optical information recording/reproducing apparatus according to claim 1, wherein
the optical path shifting element shifts the position of rays which form the first light beam according to the angle to the optical information recording medium of the rays which form the first light beam.

4. The optical information recording/reproducing apparatus according to claim 1, wherein
the optical path shifting element is made up of a substantially parallel plate.

5. The optical information recording/reproducing apparatus according to claim 1, wherein
the scanner lens exposes the optical information recording medium to parallel light of the second light beam.

6. The optical information recording/reproducing apparatus according to claim 5, wherein
the optical path shifting element is disposed in the optical path angle varying device.

7. The optical information recording/reproducing apparatus according to claim 5, wherein
the optical path angle varying element is such that the size of the second light beam exiting the optical path angle varying element varies according to the angle of the light beam exiting the optical path angle varying element.

8. The optical information recording/reproducing apparatus according to claim 1, wherein
the optical path shifting element is fixed during a recording operation of the optical information recording/reproducing apparatus.

9. The optical information recording/reproducing apparatus according to claim 6, wherein
the optical path shifting element is disposed in substantially the same posture as the optical information recording medium.

10. The optical information recording/reproducing apparatus according to claim 6, wherein
the optical path shifting element has a rotation mechanism that is driven during a recording operation of the optical information recording/reproducing apparatus.

11. The optical information recording/reproducing apparatus according to claim 3, wherein
a third lens is disposed in an optical path between the splitter and the first lens, and
an optical path shifting element is disposed in the third lens.

12. The optical information recording/reproducing apparatus according to claim 2, wherein
the optical path shifting element corrects a refractive misalignment of the second light beam on the optical information recording medium.

* * * * *